Jan. 29, 1957  C. C. HUTCHINS ET AL  2,779,907
ELECTRIC MOTOR
Filed Sept. 9, 1953

*INVENTORS*
CHARLES C. HUTCHINS
& BLAIR C. SEAMAN
BY
ATTORNEYS

United States Patent Office 2,779,907
Patented Jan. 29, 1957

2,779,907

ELECTRIC MOTOR

Charles C. Hutchins and Blair C. Seaman, Ridgway, Pa., assignors to Hutchins Electric Company, Inc., Ridgway, Pa., a corporation of Pennsylvania Application September 9, 1953, Serial No. 379,124

10 Claims. (Cl. 318—220)

This invention relates to electric motors and, more particularly, to motors of the single phase variety which are arranged to be started by the so-called phase splitting action.

Broadly the invention relates to an arrangement of motor windings wherein self-starting and high starting torques are provided by the utilization of mutual reactance effects between windings either inside or outside the motor shell and in which all of the windings remain energized both during motor starting and during motor running conditions.

A motor constructed in accordance with the invention employs only heavy wire throughout its windings and thus is more rugged and less expensive to build than a motor having windings of the type heretofore generally employed.

Furthermore, a motor constructed in accordance with the invention does not require the use of contacts which must operate during motor starting. Thus the motor in this regard is more reliable and less expensive to build than the more conventional split phase motor.

The invention will now be described in greater detail in conjunction with the accompanying drawing in which.

Figure 1:
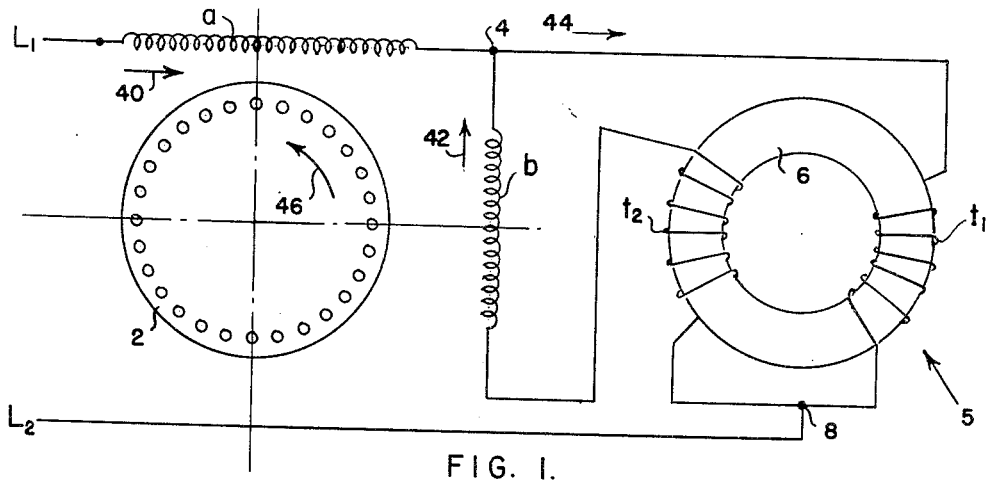
Figure 1 is a conventional motor diagram showing motor windings arranged in accordance with this invention.

Referring to Figure 1 there is shown in diagrammatic form a squirrel cage rotor 2 which may be in the form of any various types of squirrel cage rotors or other types of rotors suitable for operation with induction motors.

In Figure 1 the windings $a$ and $b$ are shown in diagrammatic form as being disposed in a stator member surrounding the rotor 2. The winding $a$ represents the main running winding of the motor which is adapted to be disposed in winding slots in customary fashion and is capable of functioning as a normal single phase motor winding after the motor has been started. This form of winding is well known and need not be described in detail.

A second winding $b$ is disposed in slots on the motor stator and so arranged as to be located approximately 90 electrical degrees from the winding $a$. This displacement angle need not, however, be limited to 90 electrical degrees. It will, in some instances, be desirable to modify this angle in order to provide for better governing of the currents flowing in the motor circuit.

The windings $a$ and $b$ are connected in series as shown in Figure 1 at a common point 4. The other end of winding $a$ is connected to power at $L_1$. A connection from the common point 4 is connected to one end of a coil $t_1$ which is wound on a core 6 of a transformer indicated generally at 5 in Figure 1. The other end of the transformer coil $t_1$ is connected at point 8 to power line $L_2$.

A second coil $t_2$ is mounted on the transformer core 6 and has one of its ends connected to the $b$ winding at the end thereof opposite from the common point 4. The other end of the winding $t_2$ is connected at point 8 to the winding $t_1$ and power line $L_2$. Thus the motor winding $a$ is connected in series with the transformer coil $t_1$ across the power lines and the motor winding $b$ is connected in series with the motor winding $a$ and the transformer coil $t_2$ across the power lines.

The turn ratio of the transformer is of the order of $$\frac{t_1}{t_2} = \frac{3}{1}$$

and the ratio of turns of the $a$ winding to the $b$ winding on the motor is of the order $$\frac{a}{b} = \frac{4}{1}$$

It will be evident that these ratios are only approximate being variable with regard to geometry of any particular motor, the characteristics of the magnetic circuit of the motor, the particular characteristics desired of the motor and are, of course, interrelated.

Figure 2:
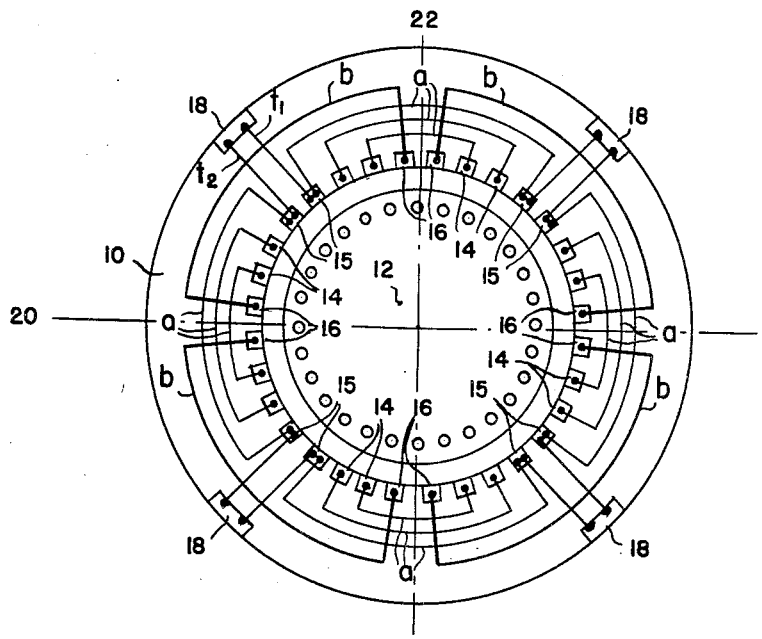
Figure 2 is a conventional showing of an embodiment of motor windings in accordance with the invention shown diagrammatically in Figure 1.

Figure 2 shows, in conventional form, a motor stator 10 and an induction motor rotor 12. Winding slots 14, 15 and 16 are provided in the motor stator in a conventional manner. The $a$ windings are distributed in the slots 14 and 15. The $b$ windings are distributed in the slots 16. The windings coils are shown diagrammatically as single lines $a$ and $b$ passing from slot to slot around the stator frame. It will be evident that each of these lines are representative of coils composed of a plurality of turns. The coils of each of the windings may be disposed in a plurality of slots and connected in spiral, lap or other conventional winding arrangement which may be desirably employed with any particular motor. The winding coils are connected as shown in Figure 1.

The stator 10 is provided with additional slots 18 extending longitudinally of the outer surface thereof and generally parallel to the slots 15.

The slot 18 is disposed midway between each of the polar axes indicated at 20 and 22. Transformer coils $t_1$ and $t_2$ are disposed in each of the exterior slots 18. The return conductors of the transformer coils are disposed in the stator slots 15 along with some of the coils of the $a$ windings. The number of slots 18 is selected to provide for the reception of the necessary number of transformer coils without unduly crowding the windings in the stator slots 15. The stator 10 provides the necessary transformer core for the transformer windings $t_1$ and $t_2$.

It will be evident that this arrangement of windings provides a motor with windings $a$ and $b$ which will operate as starting and running windings of a single phase machine and also provides windings $t_1$ and $t_2$ which are mutually inductive transformer windings. The windings $t_1$ and $t_2$ are, however, in non-mutually inductive relation with the motor windings $a$ and $b$ and, of course, also in non-mutually inductive relation with the rotor windings. These non-mutually inductive relations are obtained by disposition of windings $t_1$ and $t_2$ in such a manner that their fields will be in opposing relation in the region of the motor windings and rotor windings.

Figure 3:
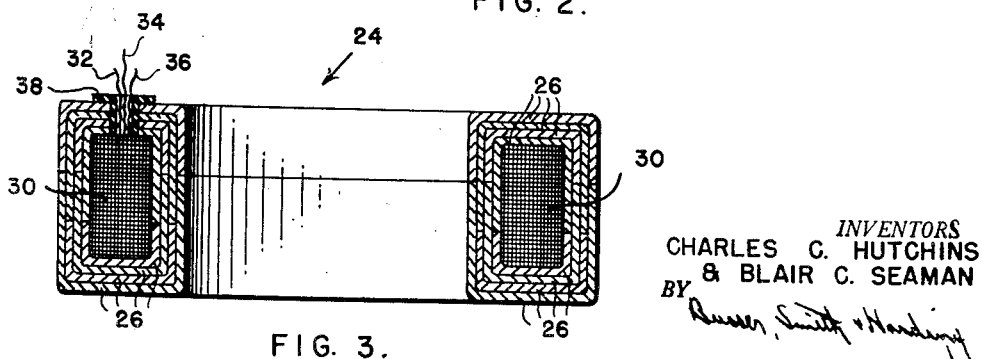
Figure 3 is a view of an alternate embodiment of a portion of the apparatus shown diagrammatically in Figure 1.

An alternative embodiment of the motor arrangement shown in Figure 1 may be obtained by merely including in a motor housing a separate toroidal transformer which may be mounted adjacent to the end of the stator frame or may be positioned to surround the stator frame. Such a transformer is shown in Figure 3 and includes a series of overlapping annularly formed cup-shaped laminations 26 of progressively greater diameter in order that they may nest together in a manner conventional of laminations and provide an annular central space within which there may be disposed conductors indicated at 30 which are, of course, the windings $t_1$ and $t_2$ of the auxiliary transformer. Lead conductors 32, 34 and 36 are brought out through a suitable insulating bushing 38 which extends through aligning bores in the laminations 26. The conductors 32, 34 and 36 provide, of course, connections to the ends of the coils $t_1$ and $t_2$. These conductors 32, 34 and 36 will then be connected to the motor winding coils in the manner shown in Figure 1. It will be evident that, when reference is made hereinafter to a transformer "core" and to windings "on" a transformer core, a transformer structure of this concentrically wound toroidal type is included.

It should be noted that the coils $t_1$ and $t_2$ in the toroidal transformer 24 are wound concentrically and are wound in the same sense, that is, cumulatively. Thus they may be considered as representing a special form of auto transformer or, alternatively, a single coil with a tap. This toroidal form of transformer is preferred in that it lends itself to mounting around the motor shaft and inside of the motor end bell in the event that the transformer is made as a separate entity rather than wound on the motor stator laminations as shown in Figure 2. Furthermore, this form of transformer structure provides the maximum output for the minimum quantity of material.

Broadly, the operation of the motor is as follows: As previously described, the $a$ winding is selected and disposed to provide a normal single phase motor running winding. The $b$ winding is disposed at an angle thereto and on motor starting provides the starting winding carrying the displaced current. The current displacement exists both because of the relative impedance characteristics of the $a$ and $b$ windings and because of the presence of the mutual reactance between currents flowing through the transformer 5. The transformer coil $t_1$ having the greater number of turns may be considered as being the controlling winding and as the motor comes up to speed, the mutual reactance in the windings of transformer 5 serves to govern current flow through the winding $b$ controlling both its magnitude and its phase displacement with respect to the current flowing in the winding $a$. This operation is similar to the operation of motors previously described in our copending applications, Serial No. 361,564, filed June 15, 1953, and Serial No. 250,276, filed October 8, 1951.

The operation of the present motor depends upon the relative impedances of the various elements. The determination of the impedances of the transformer is simplified by adopting a modified definition of mutual reactance. When current is passed through the $t_1$ side of the transformer, the vector ratio of voltage on the $t_2$ side to this current can be determined as $Z_{mt_1}$. When current is passed through the turns on the $t_2$ side of the transformer, the vector ratio of the voltage on the $t_1$ side of this current can be determined as $Z_{mt_2}$. These are the mutual reactances. The total self inductances can be defined as the vector ratios of voltage to current on each side separately giving $Z_{st_1}$ and $Z_{st_2}$. The impedances of the motor windings $Z_a$ and $Z_b$ at any operating speed on the motor curve, are determined in the usual fashion by either test or computation. The direction of relative current flow through the two motor windings is indicated in Figure 1 by the arrows 40, 42 and 44. It will be noted that the current flow through the $t_1$ winding is a summation of the currents in the $a$ and $b$ windings. The following equations may be written including the above impedance factors and currents $i_a$ and $i_b$ in the $a$ and $b$ windings, respectively:

$$E_L = i_a Z_a - i_b Z_b - i_b Z_{st_{2b}} + i_b Z_{mt_{2b}} + i_a Z_{mt_{2a}} \quad (1)$$

$$0 = i_b Z_b + i_b Z_{st_{1b}} + i_a Z_{st_{1a}} + i_b Z_{st_{2b}} - i_b Z_{mt_{1b}} - i_a Z_{mt_{2a}} - i_b Z_{mt_{2b}} \quad (2)$$

The subscripts $a$ and $b$ are carried on the terms to indicate that the transformer saturation varies for differing current values. Hence, for a close solution it is necessary to take this variation into account.

From Equation 2 it may be shown that:

$$i_b = Z i_a$$

where $$Z = \frac{(Z_{mt_{2a}} - Z_{st_{1a}})}{(Z_b + Z_{st_{1b}} + Z_{st_{2b}} - Z_{mt_{1b}} - Z_{mt_{2b}})}$$

and from Equation 1

$$i_a = \frac{E_L}{(Z_a + Z_{mt_{2a}}) + Z(Z_{mt_{2b}} - Z_{st_{2b}} - Z_b)}$$

The cross section of the transformer core is proportioned so that the core becomes saturated at the instant of motor starting, thus giving a smaller value of self and mutual impedances during starting than will exist when the motor approaches speeds in which the currents in the $a$ and $b$ windings fall to low values. It is important to recognize that this increase in impedance values in the auxiliary transformer circuit are of great assistance in securing running balance desired under full speed conditions. It will be evident that the transformer proportions must be selected to give these impedance values.

In proportioning the transformer due consideration must be given to the variations in impedances mentioned above. In addition, it has been found preferable to use turn ratios in the transformer of the order of $$\frac{t_1}{t_2} = 3$$

or at least in the usual case to make the turns $t_1$ of greater number than the turns $t_2$ to insure the desired directions of current flow.

Inasmuch as the use of this extra transformer action is the principal governing feature of the motor operation, it is believed unnecessary to describe further the theory of the operation of the motor itself other than to state that, for the most satisfactory operation and for the use of the smallest transformer, it is preferred to use a relatively small number of turns of winding $b$ and to make these of heavy sectioned conductor for the sake of ruggedness in the finished structure. The transformer windings and the $a$ windings are also of heavy section as resistance values are not relied upon for operation that depends on the presence of relative reactances as a principal motor current controlling factor.

When the motor is operating at normal running speed, the currents in the windings $a$ and $b$ are displaced by a substantial amount. In the average case, this displacement will be more than 90°. Generally, the currents will be of about equal orders of magnitude. The summation currents, the current in the winding $a$ plus the current in winding $b$, will normally be approximately 50% of the current in either the $a$ or $b$ windings indicating the presence of a wide phase angle. The phase displacement between the currents in the $a$ and $b$ windings will, of course, result in a circulating current within the motor windings. This circulating current is favorable in the controlling operation of the transformer and the heavy windings in the motor circuit insure a low loss of power as a result of this circulating current during motor operation.

When the transformer is wound directly on the stator core as indicated in Figure 2, it is not possible to over saturate the transformer core to the degree that can be obtained by the use of the separate transformer assembly as indicated schematically in Figure 1 and as shown physically in Figure 3. However, the structural arrangement shown in Figure 2 is highly desirable in those cases where it is desirable to eliminate all accessories in connection with the motor especially for reasons of securing lowest manufacturing costs. The dual use of the motor and core in this manner permits the securing of substantial savings.

It will be evident that, while the basic embodiment of the invention has been disclosed herein, numerous modifications may be made in the connections of the elements disclosed and with regard to the mutual inductance existing between the various elements disclosed. For example, a motor could be made to operate by connecting the series connection of the winding $a$ and the transformer winding $t_1$ in parallel relation with the series connection of the winding $b$ and the transformer winding $t_2$ though this would produce a much less satisfactory machine. Similarly, the mutual inductance occurring between the windings $t_1$ and $t_2$ may be supplemented by a degree of mutual inductance between the windings $a$ and $b$. The most preferable embodiment is, however, that shown in Figure 1 which may take the form shown in Figure 2 or a form employing a toroidal transformer such as that shown in Figure 3 which may be included inside the motor frame or, if desired, as a separate unit externally of the motor frame. It will be evident that these and other modifications may be made to the embodiment of the invention disclosed herein without departing from the scope of the invention as set forth in the following claims.

What is claimed is:

1. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other and connected in series relation with each other and in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings, minimizing said circulating current during normal running operation of the motor and governing the phase displacement of said circulating current with respect to the current flowing in said other winding of said first pair for providing motor starting.

2. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other and connected in series relation with each other and conductively connected in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of said circulating current with respect to the current flowing in said other winding of said first pair for providing motor starting.

3. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other on a magnetic core and connected in series relation with each other and conductively connected in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of said circulating current with respect to the current flowing in said other winding of said first pair for providing motor starting.

4. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other on a magnetic core of a size to be saturated by flux produced by currents flowing in at least one of said second pair of windings during motor starting and connected in series relation with each other and conductively connected in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of said circulating current with respect to the current flowing in said other winding of said first pair for providing motor starting.

5. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings concentrically wound in mutually inductive relation with each other on a toroidal magnetic core connected in series relation with each other and conductively connected in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of said circulating current with respect to the current flowing in said other winding of said first pair for providing motor starting.

6. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings displaced from said winding receiving means, positioned in mutually inductive relation with each other, connected in series relation with each other and conductively connected in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of said circulating current with respect to the current flowing in said other winding of said first pair for providing motor starting.

7. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other and in non-mutually inductive relation with said first pair of windings, connected in series relation with each other and conductively connected in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of said circulating current with respect to the current flowing in said other winding of said first pair for providing motor starting.

8. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other and connected in series relation with each other and conductively connected in parallel relation with one winding of said first pair of windings, said second pair of windings being wound on said stator member and lying on a plane extending substantially parallel to the axis of rotor rotation, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of the circulating current with respect to the current flowing in said other winding of said first pair for providing motor starting.

9. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other and connected in series relation with each other and conductively connected in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings and governing the phase displacement of said circulating current with respect to the current flowing in said other winding of said first pair for providing motor starting, said other winding of said first pair having a substantially greater number of turns than said one winding of said first pair and the winding of said second pair connected to the connection between the windings of said first pair having a substantially greater number of turns than the other winding of said second pair.

10. A self-starting alternating current electric motor comprising a rotor member and a stator member, one of said members including means adjacent to the other of said members for the reception of windings, a first pair of windings connected in series relation and distributed in displaced relation with respect to each other in said winding receiving means, a second pair of windings positioned in mutually inductive relation with each other and connected in series relation with each other and in parallel relation with one winding of said first pair of windings, and means for connecting a source of power across the open end of the other of said first windings and the connection between the windings of said second pair, the relative numbers of turns of said windings and the mutual inductance between the windings of said second pair governing the magnitude of the current circulating in the parallel arrangement of said pair of second windings and said one of said first windings, minimizing said circulating current during normal running operation of the motor and governing the phase displacement of said circulating current with respect to the current flowing in said other winding of said first pair for providing motor starting, said other winding of said first pair having a substantially greater number of turns than said one winding of said first pair and the winding of said second pair connected to the connection between the windings of said first pair having a substantially greater number of turns than the other winding of said second pair.

References Cited in the file of this patent

UNITED STATES PATENTS

| | | |
|---|---|---|
| 433,702 | Tesla | Aug. 5, 1890 |
| 583,951 | Steinmetz | June 8, 1897 |
| 1,433,765 | Weber | Oct. 31, 1922 |
| 1,844,093 | Kennedy | Feb. 9, 1932 |
| 2,646,537 | Lewus | July 21, 1953 |